June 4, 1946.  R. J. O'CONNELL ET AL  2,401,368
METHOD FOR TESTING THE AIRTIGHTNESS OF CLOSED CONTAINERS
Filed June 2, 1943
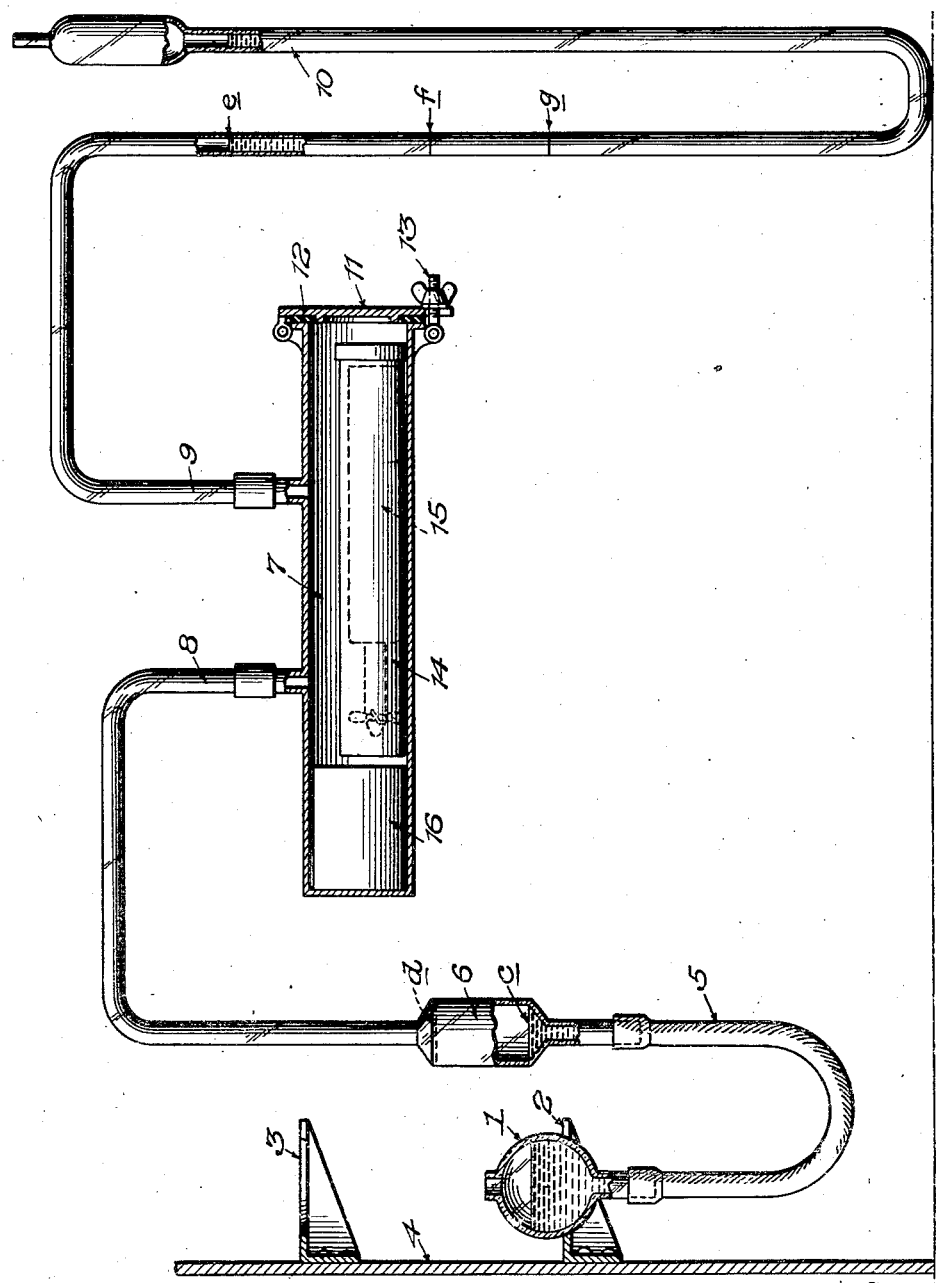
Inventors
ROBERT J. O'CONNELL,
IRVING COHEN, CARL ROSENBLUM,
By C. E. Herrstrom & W. E. Thibodeau
Attorneys Patented June 4, 1946

2,401,368

UNITED STATES PATENT OFFICE 2,401,368

METHOD FOR TESTING THE AIRTIGHTNESS OF CLOSED CONTAINERS

Robert J. O'Connell, Succasunna, and Irving Cohen, Elizabeth, N. J., and Carl Rosenblum, Brooklyn, N. Y.

Application June 2, 1943, Serial No. 489,358

4 Claims. (Cl. 73—40)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a testing method having particular application in the testing of loaded and sealed bomb fuze containers to determine if said containers are air proof.

In the packing of the fuze parts, it is vitally essential that the parts be packed in containers that are absolutely air and moisture proof in order to protect the fuze parts from the destructive elements such as air, moisture, and the like.

Heretofore tests have been conducted to determine whether the containers having fuze parts packed therein are air-tight in the following manner. The containers were punctured and rigged to a suitable testing device utilizing air pressure and a conventional type of manometer. It is obvious that the practice outlined above will require the use of an independent source of air pressure at the times when it is desired to operate the device. In addition puncturing of the containers makes it necessary that the openings be soldered to seal the said openings. It has also been found that such additional soldering operation, will not in all instances completely reseal the container as it has been found that the solder will not adhere and form an air-tight seal to some types of steel containers within which the fuze parts are contained. It is obvious that such practice is time consuming and costly.

The primary object of the present invention is to provide a method for testing the air-tightness of fuze containers without the need of puncturing the containers.

Another object of the invention is to provide a method for testing containers of the type indicated without the need of utilizing an independent air pressure source.

This invention is based on the well known physical law that in a closed system, pressure varies inversely with volume. In the utilization of the device hereinafter described, in the practice of the method, if an air-tight container is inserted for test purposes, the container will displace more volume than a container which is not air-tight, thus producing a difference in pressure when a definite volume change is introduced in the closed system.

The invention can best be understood from the following description to be read in view of the accompanying sheet of drawings in which the single figure shows a diagrammatic representation of apparatus suitable for use in practicing the invention.

Referring to the drawing, 1 indicates the leveling bulb within which is contained a suitable amount of mercury. The bulb 1 is movable and can be positioned upon either of two arms 2 and 3 respectively affixed to a stand 4. A section of pliable tubing 5 joins the leveling bulb 1 to an air chamber 6. The air chamber 6 in turn is in communication with a chamber 7 by means of tubing 8. Leading from another portion of chamber 7 is another section of tubing 9 which in turn is connected to a conventional type of transparent manometer 10. Chamber 7 is provided with a hinged cover 11 having a rubber gasket 12 to insure an air-tight seal when the device is in operation. A lock 13 is provided in order to rigidly keep the cover 11 in position. Shown within the chamber 7 is a can 14 containing therein a bomb fuze 15. In order to adapt the chamber 7 for the insertion of varied size fuze containers, there is provided an adaptor 16 which can be of such size as to take up any unused volume in the chamber. When cover 11 is closed to effect an air-tight seal, and bulb 1 is on lower arm 2, the sum of the internal volumes of chambers 6 and 7 constitutes a closed system of definite volume. When bulb 1 is raised to arm 3, the liquid in bulb 1, tube 5 and chamber 6 rises in chamber 6 from the level $c$ to the level $d$, thus decreasing the volume of said system by a definite amount.

In the operation of the testing device described above, the fuze container 14 is inserted into the chamber 7 and the chamber is locked. The system comprising the combined volume of chambers 6 and 7 is now at an initial pressure which will usually be that of the atmosphere, e. g., about 14.7 p. s. i. abs. The leveling bulb 1 is then raised from arm 2 to arm 3, causing the mercury to rise in the air chamber from position $c$ to position $d$ to establish a final or test pressure. If the can 14 contained within the chamber 7 is air-tight the water in the manometer will drop to the position $g$. If, however, the can 14 is not air-tight and has a leak therein the air pressure within the chamber 7 will be correspondingly lowered and the manometer 10 will indicate the lower pressure at the point $f$. It is obvious that both legs of the manometer 10 can be marked off to indicate at what points on the manometer good any leaky fuze containers will be shown. The minimum time required between the change in volume of the closed system and the change in initial pressure necessary to distinguish between perforate and imperforate containers, will depend mainly upon the ratio of initial and final volumes of the test chamber and the initial pressure employed. For each apparatus and conditions of test the necessary minimum time required will be substantially constant and may be easily determined by calibration tests using specimens known to be perforate and imperforate.

Having thus described the invention, what is claimed as new is:

1. That method of testing a supposedly sealed container for leakage, comprising, positioning said container within a closed system of definite initial volume and filled with a gas at definite initial pressure, changing said initial volume by a definite volume to thereby cause a change in said initial pressure, and measuring the resulting change in said initial pressure as a criterion of the perforate or imperforate condition of said container.

2. That method of testing a supposedly sealed container for leakage, comprising, positioning said container within a definite initial volume of gas at a definite initial pressure, changing said volume by a definite fraction of said initial volume to establish a test pressure, and measuring any resulting departure of said test pressure from the normal for an imperforate container, as a criterion of the perforate or imperforate condition of said container.

3. That method of testing a supposedly sealed container for leakage, comprising, placing said container within a closed chamber having therein a definite volume of gas at a first known pressure, changing the volume of said chamber by a definite increment to establish a final pressure, and measuring the resulting final pressure of said gas as a result of said change in volume, as a criterion of the perforate or imperforate condition of said container.

4. That method of testing a supposedly sealed container for leakage, comprising, placing said container within a confined fixed mass of gas at an initial volume and pressure, decreasing said volume by a definite increment to establish a test pressure, and measuring any departure of said test pressure from normal for an imperforate container, as a criterion of the perforate or imperforate condition of said container.

ROBERT J. O'CONNELL.
IRVING COHEN.
CARL ROSENBLUM.